United States Patent [19]
Decker

[11] Patent Number: 5,803,098
[45] Date of Patent: Sep. 8, 1998

[54] VEHICLE WASHING INSTALLATION

[75] Inventor: Wolfgang Decker, Zusmarshausen-Wollbach, Germany

[73] Assignee: Wesumat Fahrzeugwaschanlagen GmbH, Augsburg, Germany

[21] Appl. No.: 904,973

[22] Filed: Aug. 1, 1997

[30] Foreign Application Priority Data

Aug. 21, 1996 [DE] Germany .................. 196 33 673.2

[51] Int. Cl.⁶ .................................................. B08B 1/02
[52] U.S. Cl. ..................... 134/56 R; 134/123; 134/181; 134/198; 198/717
[58] Field of Search .................... 134/123, 181, 134/172, 198, 138, 56 R, 72, 151, 140, 144; 198/74, 6, 717

[56] References Cited

U.S. PATENT DOCUMENTS

| | | | |
|---|---|---|---|
| 2,699,792 | 1/1955 | Fisher | 134/56 R |
| 2,862,222 | 12/1958 | Crockell | 134/123 |
| 3,072,131 | 1/1963 | Laurenzio | 134/123 |
| 3,288,109 | 11/1966 | Smith, Jr. et al. | 134/123 |
| 3,451,094 | 6/1969 | Kywi | 134/123 |
| 3,459,203 | 8/1969 | Pritchard | 134/123 |
| 3,612,077 | 10/1971 | Capro | 134/123 |
| 3,701,356 | 10/1972 | Hanna et al. | 134/123 |
| 4,039,075 | 8/1977 | Gray | 198/746 |
| 4,135,533 | 1/1979 | Gall et al. | 134/123 |
| 4,946,513 | 8/1990 | Del Prato et al. | 134/123 |

FOREIGN PATENT DOCUMENTS

| | | |
|---|---|---|
| 0 748 729 | 12/1996 | European Pat. Off. . |
| 2250838 | 4/1974 | Germany .................. 134/181 |
| 38 12 476 | 6/1989 | Germany . |
| 782979 | 9/1957 | United Kingdom .................. 134/172 |

*Primary Examiner*—Frankie L. Stinson
*Attorney, Agent, or Firm*—Flynn, Thiel, Boutell & Tanis, P.C.

[57] ABSTRACT

The vehicle washing installation comprises at least one conveyor chain (1) in the form of a sprocket chain, by means of which the vehicles are moved through the installation, and a plurality of treatment units arranged along the path of movement of the vehicle for washing and optionally drying the vehicle. At least one of the treatment units is mounted in a carrier adapted to move forwards synchronously with the vehicle over a path length and to be moved back by means of a resetting device to its starting position. The carrier can be coupled mechanically to the conveyor chain (1) for the forward movement. The coupling device comprises a coupling member (8) which can be brought into direct engagement with the conveyor chain (1). The coupling member (8) is of comb-like form and comprises a plurality of teeth (8a) spaced in the longitudinal direction (L) of the chain at a distance (b) from one another, with gaps (8b) therebetween. The pitch (t1) of the gaps (8b) is an integral fraction of the pitch (t) of the chain studs (10). The gap width (b) in the longitudinal direction (L) of the chain is somewhat greater than the diameter (d) of the chain studs (10).

4 Claims, 3 Drawing Sheets

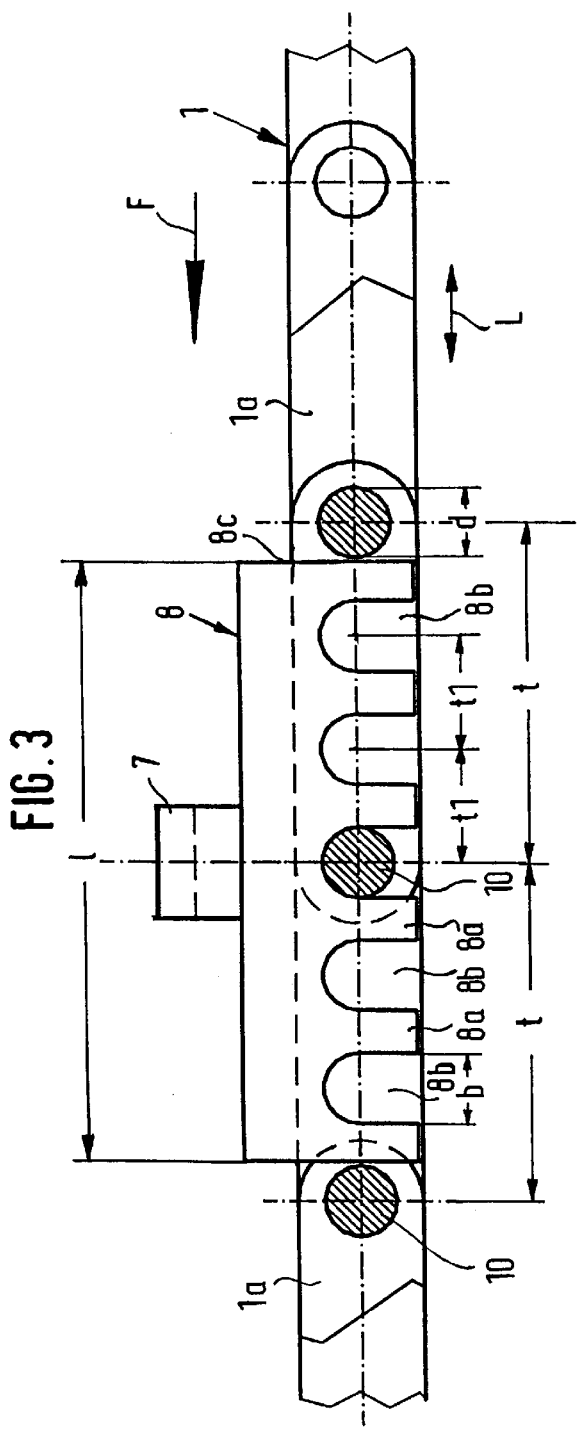
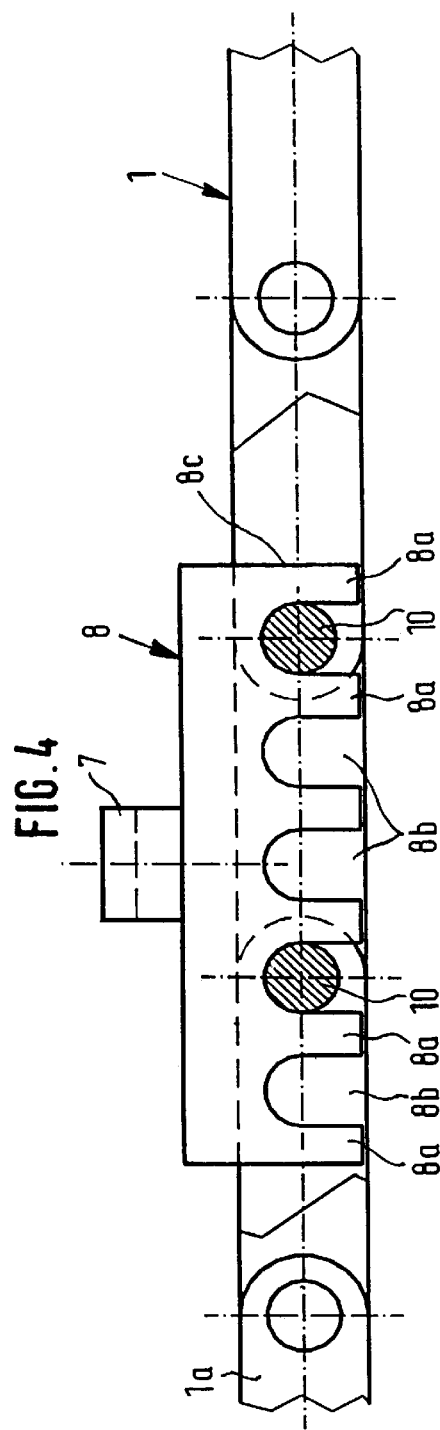

ABOUT THIS PATENT

VEHICLE WASHING INSTALLATION

This invention relates to a vehicle washing installation with at least one endless conveyor chain provided for moving the vehicle through the installation and which is in the form of a sprocket chain and whose side plates are connected together by chain studs arranged at equal distances from one another, a plurality of treatment units arranged along the path of movement of the vehicle for washing or drying the vehicle, of which at least one is mounted in a carrier adapted to move forwards synchronously with the vehicle over a path section and to be moved back to its starting position by means of a restoring device, and a coupling device provided on the carrier, with a coupling member movable transverse to the chain stud axes and perpendicular to the longitudinal direction of the chain, which can be brought into direct engagement with the conveyor chain for the forward movement of the carrier.

Such a vehicle washing installation is described in the post-published EP 0 748 729 A1 or in DE 3 812 476 C1. Since the treatment unit concerned is mechanically coupled to the conveyor chain by the coupling device for the forwards movement it is ensured with very small technical outlay that the conveyor chain and thus the vehicle and the washing or drying unit in question coupled to the conveyor chain move with precisely the same speed. Because of the direct engagement of the coupling member in the conveyor chain the coupling device is of particularly simple construction. A light barrier, a contact or the like is provided to control the coupling device. As soon as particular vehicle parts, e.g. the bumper, a wheel or the like come into the region of these sensors, the coupling device is actuated and the coupling member is brought into engagement between two chain studs. Since however, the chain studs are arranged a relatively large pitch of 125 mm for example, i.e. with a relatively great distance from one another, it can occur that the carrier and thus the treatment unit carried thereby do not assume the desired position relative to the vehicle in the conveyor direction. If the treatment unit is a drying nozzle for example, which is moved transverse to the conveying direction along the front or back of the vehicle, the drying results are unsatisfactory on account of too great a tolerance in the distance of the drying nozzle from the vehicle region to be dried. The same also applies for example to wheel washers in relation to the washing results.

The invention is therefore based on the object of so designing the coupling device in vehicle washing installations of the kind initially recited that the treatment unit in question is located in the predetermined position relative to the vehicle with smaller tolerances when the carrier is coupled up.

This is achieved according to the invention in that the coupling member is of comblike form and comprises a plurality of teeth arranged at a distance from one another in the longitudinal direction of the chain, with gaps therebetween, in that the pitch of the gaps is an integral fraction of the pitch of the chain studs and in that the gap width in the longitudinal direction of the chain is somewhat greater than the diameter of the chain studs or sleeves surrounding these.

Because of the comb-like design of the coupling member, at least one of the chain studs always engages in one of the gaps of the coupling member in the engaged position thereof. Since the pitch of the gaps is only a fraction of the pitch of the chain studs, the treatment unit in question of the carrier currently coupled to the conveyor chain comes into the predetermined position relative to the vehicle with substantially smaller tolerances. The pitch of the gaps can advantageously be a quarter or a third of the pitch of the chain studs. The tolerance is thus reduced to a quarter or a third of the stud pitch. Uniformly good drying or washing results are thus ensured.

In an advantageous arrangement of the invention the length of the coupling member should be sufficiently great for at least two chain studs to bear on its teeth in the engaged position. Good transfer of force between the conveyor chain and the carrier, with little wear, is thereby obtained.

BRIEF DESCRIPTION OF THE DRAWINGS

The invention is explained in more detail below with reference to an embodiment shown in the drawings, in which.

In vehicle washing installations of the kind here described, so-called wash lines, the vehicles to be washed are moved by a conveyor device through the installation. This conveyor device consists as a rule of two endless conveyor chains 1, 1' parallel to one another, between which entraining rollers 12 are arranged at certain intervals. These entraining rollers are applied from the rear to one of the wheels of the vehicle to be washed or dried and thus push the vehicle through the washing installation. There are also conveyor devices with only one endless conveyor chain, on which the entraining rollers are then arranged as outriders. The direction in which the vehicle to be washed is moved by the conveyor chains 1, 1' is denoted F.

A plurality of treatment units for washing and drying the vehicle can be arranged along the path of movement, of which some have to be moved over a path section synchronously with the vehicle in its direction of movement F. The invention is described more particularly for the example of a drying unit 2 shown in FIGS. 1 and 2. The movable treatment units are each arranged in a carrier, which carriers are movable forwards in the direction of movement F of the vehicle and, after completion of the washing or drying operation, can be moved back into their starting position by a restoring device, not shown, such as counterweights, springs, pneumatic cylinders or the like for example. As carriers are to be understood here any kind of apparatus which is suitable for the movable mounting of the treatment unit in question, such as a slide, a gantry, a frame, a swinging arm or the like for example.

Figure 1:
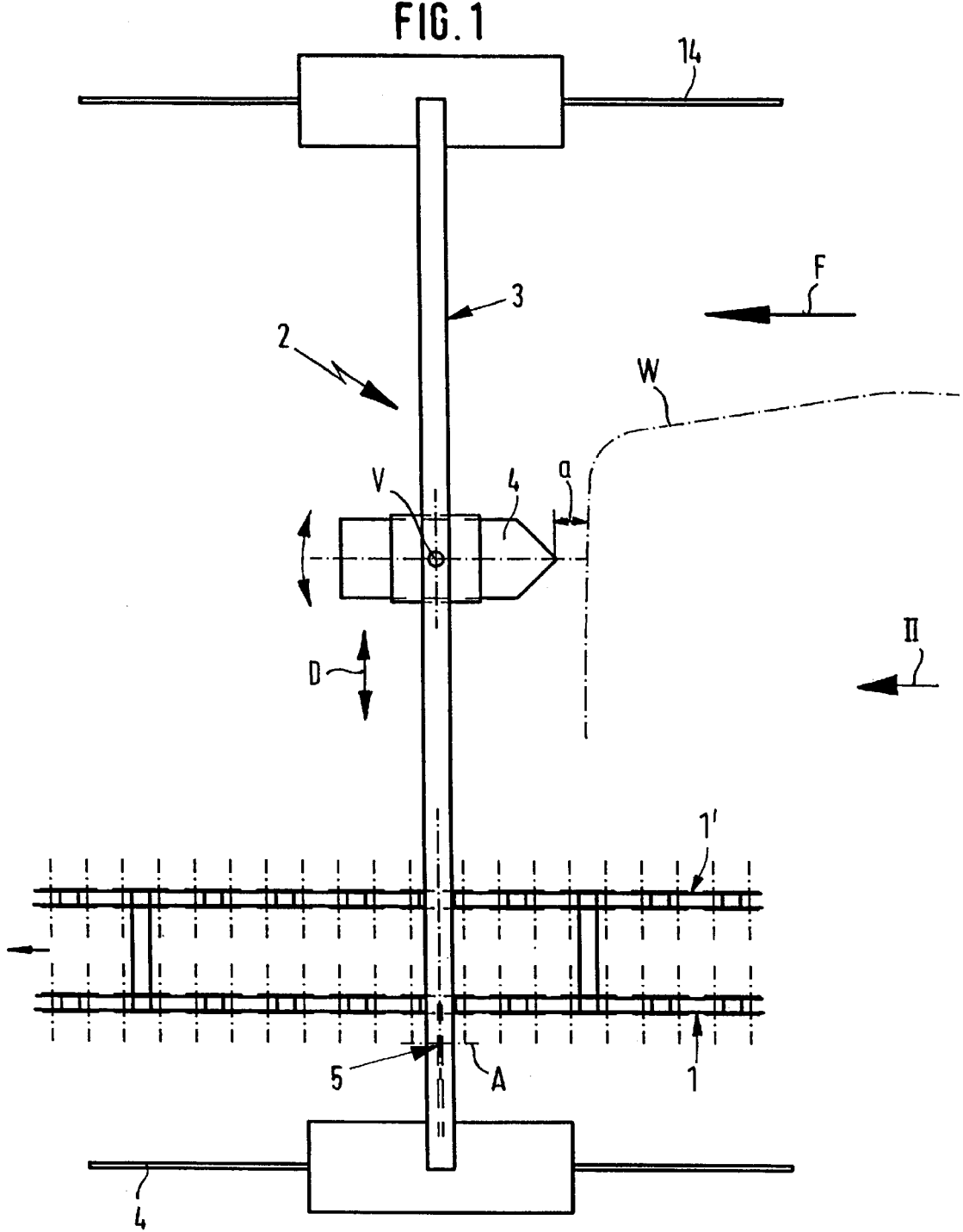
FIG. 1 is a plan view of the apparatus according to the invention for the example of a drying unit.
Figure 2:
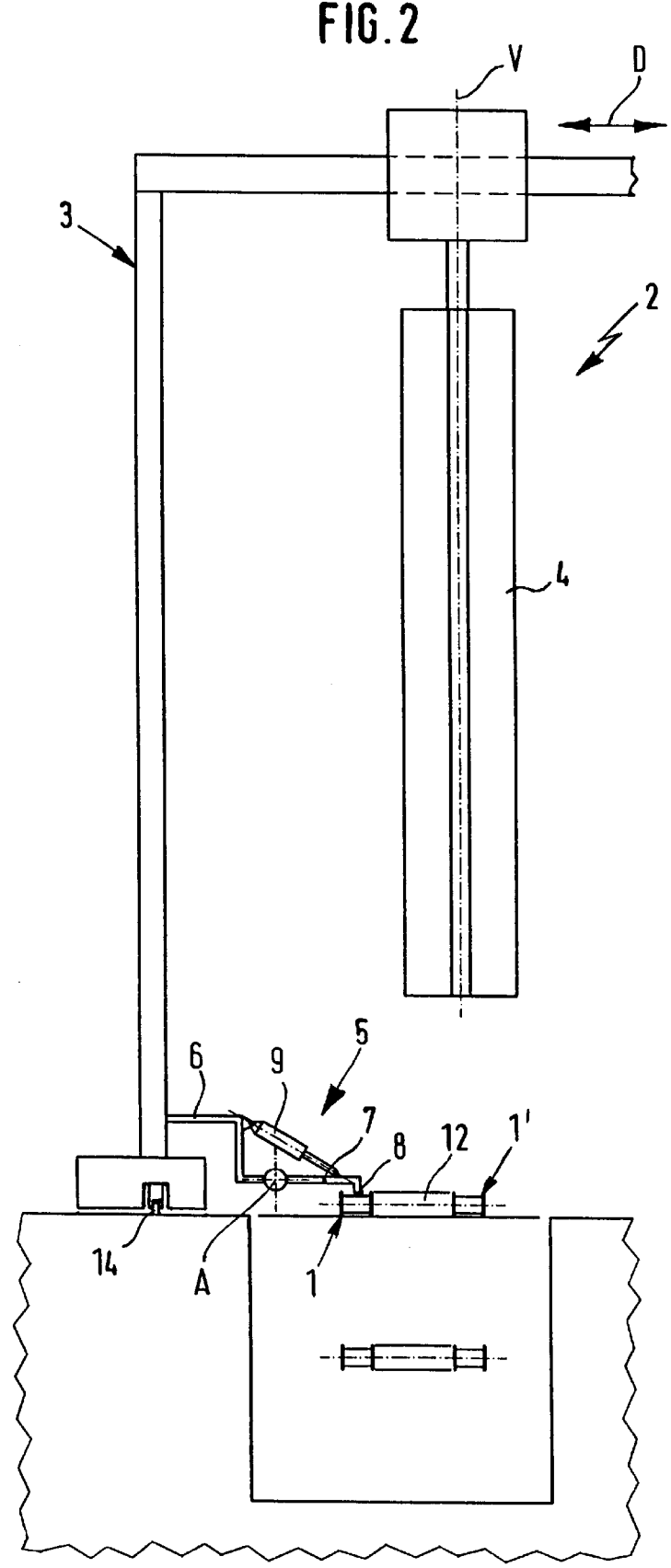
FIG. 2 is a partial front view in the direction II of FIG. 1, FIGS. 3 and 4 are side views of the coupling member in different positions of engagement with the conveyor chain.

In the drying unit 2 shown in FIGS. 1 and 2 a gantry 3 is provided and is movable on rails 14 forwards in the conveyor direction F and back again opposite to the direction of the arrow F. At least one vertical drying nozzle 4 is mounted for movement on the gantry 3 in the direction D transverse to the conveyor direction F. The drying nozzle 4 can also be mounted to pivot about a vertical axis V.

A coupling device 5 is provided in order to be able to move the carrier or gantry 3 of the drying unit synchronously forward with the vehicle. This coupling device 5 is fitted on a bracket arm 6 of the gantry 3. It comprises a coupling arm 7 pivoting about an axis A extending in the conveyor direction F and carrying a coupling member 8. A pneumatic cylinder 9 or the like is provided to move the coupling arm 7.

The conveyor chains 1, 1' are formed as sprocket chains. Since the coupling member 8 only cooperates with the outer conveyor chain 1, reference will be made only to this conveyor chain in the following. The side plates 1a of this conveyor chain are connected together in known manner by chain studs 10, which extend transverse to the longitudinal direction L of the chain. The chain studs 10 can also be surrounded by sleeves (sleeved chain), though this is not shown in the drawings. The chain studs 10 have a diameter of about 25 mm. Insofar as they are surrounded by a sleeve, the diameter d is to be understood in the following explanation as the sleeve diameter, i.e. the diameter of that part with which the coupling member 8 engages. The chain studs 10 are arranged at the same axial distances, i.e. with the same pitch t, of around 125 mm.

The coupling member 8 is of comb-like form and has a plurality of teeth 8a spaced from one another in the longitudinal direction L of the chain, with gaps 8b lying therebetween. The teeth 8a and gaps 8b are formed by suitable recesses in the coupling member 8. The distance between centres, i.e. the pitch t1 of the gaps 8b is an integral fraction of the pitch t of the chain studs 10, preferably a quarter or, as is shown in the drawing, a third of the pitch t. In the illustrated embodiment the pitch t1 therefore amounts to about 42 mm. The smaller the pitch t1, the greater is the position accuracy of the treatment unit. However the pitch t1 of the gaps 8b cannot be made arbitrarily small, since the width of the teeth 8a remaining between the gaps would otherwise be too small to transmit the force. The width b of the gaps 8b must be slightly greater than the diameter d of the chain studs 10 or a sleeve surrounding the chain studs, insofar as a sleeved chain is involved. The width b must be so chosen that the chain stud 10 or the sleeve can easily enter the current gap 8b of the coupling member 8.

The length of the coupling member 8 is advantageously sufficiently large for at least two chain studs 10 to bear on the teeth 8a of the coupling member 8 in the engaged position, as is shown in FIGS. 3 and 4. The transfer of the thrust force from the conveyor chain 1 to the coupling member 8 is thus always effected through two chain studs 10. Should this not be the case, it is sufficient for the length I of the coupling member 8 to be slightly smaller than the clear distance between one chain stud 10 and the next one but one, which can be seen from FIG. 3.

When a vehicle W moved by the conveyor chains 1, 1' in the direction F comes into the vicinity of the drying unit 2, the compressed air cylinder 9 is so controlled by a light barrier, a contact or the like, not shown, that it presses the coupling arm 7 down in the direction of the conveyor chain 1. The coupling member 8 thus comes into the region between the chain side plates 1a and one of the chain studs 10 enters into the central gap 8b of the coupling member 8, as is shown in FIG. 3 by way of example. Force is transferred from the conveyor chain 1 to the coupling member 8 and through the coupling arm 7 and the bracket arm 6 to the gantry 3, through this chain stud 10 and the chain stud 10 at the right end 8c of the coupling member 8. The gantry is now moved with the same speed as the conveyor chain 1 advances the vehicle W in the conveyor direction F, synchronously with the vehicle W to the left and the drying nozzle 4 is thus retained a constant, predetermined distance a from a specific vehicle part, for example the bumper. While the gantry 3 is moved synchronously with the vehicle W, the drying nozzle 4 is displaced on the gantry 3 in the direction D transverse to the conveyor direction F. A second, like drying nozzle can advantageously be arranged on the gantry 3 and be moved in the opposite direction to the illustrated drying nozzle 4. Starting from a central position on the gantry, the two nozzles are moved out oppositely from one another and thus dry the front part of the vehicle. As soon as they have moved far enough apart, they are turned in through 90°, so that their exit slots are now directed towards the sides of the vehicle W. By means of a limit switch, not shown, arranged on the gantry, the pneumatic cylinder 9 is so controlled as soon as the drying nozzles 4 have reached their outer limit position that it swings the coupling arm up, whereby the coupling member 8 removes from the conveyor chain 1 and the gantry 3 is thus released from the conveyor chain again. By means of a resetting device, not shown, the gantry 3 is slowly moved back against the direction of the arrow F into its starting position, while the vehicle continues to be advanced in the direction F at the same time by the conveyor chains 1, 1'. Relative movement between the drying nozzles 4 and the vehicle W thereby results and the sides of the latter are dried. When the back of the vehicle has removed far enough from the drying unit 2, the pneumatic cylinder 9 of the coupling device 5 is actuated again by a light barrier or another sensor and the coupling member 8 is moved down. Depending on which position the conveyor chain 1 has just reached, two chain studs 10 can now enter the second and last gap 8b of the coupling member 8, as is shown in FIG. 4. Since the gaps 8b are arranged with a pitch of 42 mm the distance a of the drying nozzles 4 from the vehicle front or back can be at the most 42 mm smaller or larger, which however still always guarantees an outstanding drying effect. Before drying the back the drying nozzles 4 are again turned on through 90°, so that they are now directed opposite to the position shown in FIG. 1 on to the back of the vehicle. During the drying of the back of the vehicle the drying nozzles are moved towards each other from the outside towards the inside. After the drying of the back of the vehicle has been completed, the coupling device is released again and the drying unit 2 can again return to its starting position under the action of the resetting device. It is naturally also possible for the drying unit to be so designed that only the front of the vehicle and the back of the vehicle are dried with the co-travelling drying unit, while the drying of the sides is effected by stationary drying nozzles.

If the novel coupling member is used to couple a washing unit, e.g. a wheel washer, to the conveyor chain, the finer pitch t1 of the gaps 8b ensures that the brush axis of the rotating brush in the wheel washer lies as close as possible to the axis of the wheel to be washed.

It does not matter if the gaps 8b of the coupling member 8 do not register precisely with the chain studs 10 when the pneumatic cylinder 9 is actuated. In the latter case the undersides of one or two teeth 8a engage on one or two of the chain studs 10 which move on slowly together with the conveyor chain 1. The chain studs 10 thus come into a position in which they register with one or two of the gaps 8b, so that the coupling member 8 then can come into engagement with the chain stud 10.

I claim:

1. A vehicle washing installation with at least one endless conveyor chain provided for moving the vehicle through the installation and which is in the form of a sprocket chain and whose side plates are connected together by chain studs arranged at equal distances from one another, a plurality of treatment units arranged along the path of movement of the vehicle for washing or drying the vehicle, of which at least one is mounted in a carrier adapted to move forwards synchronously with the vehicle over a path section and to be moved back to its starting position by means of a restoring device, and a coupling device provided on the carrier, with a coupling member movable transverse to the chain stud axes and perpendicular to the longitudinal direction of the chain, which can be brought into direct engagement with the conveyor chain for the forward movement of the carrier, characterized in that the coupling member (8) is of comb-like form and comprises a plurality of teeth (8*a*) arranged at a distance (b) from one another by in the longitudinal direction of the chain (L), with gaps (8*b*) therebetween, in that the pitch (t1) of the gaps (8*b*) is an integral fraction of the pitch (t) of the chain studs (10) and in that the gap width (b) in the longitudinal direction of the chain (L) is somewhat greater than the diameter (d) of the chain studs (10) or sleeves surrounding these.

2. A vehicle washing installation according to claim 1, characterized in that the pitch (t1) of the gaps (8*b*) is a quarter or a third of the pitch (t) of the chain studs (10).

3. A vehicle washing installation according to claim 1, characterized in that the length (1) of the coupling member (8) is sufficiently large for at least two chain studs (10) to engaged with its teeth (8*a*) in the engaged position.

4. A vehicle washing installation according to claim 3, characterized in that the length (1) of the coupling member (8) is slightly smaller than the clear distance between one chain stud (10) and the next chain stud (10) but one.

* * * * *